(12) United States Patent
Nakamura et al.

(10) Patent No.: US 6,472,461 B1
(45) Date of Patent: Oct. 29, 2002

(54) RUBBER COMPOSITION FOR TIRES AND PNEUMATIC TIRE

(75) Inventors: Eiji Nakamura, Tokyo; Toshiyuki Ishikuro, Saitama-ken, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/559,548

(22) Filed: Apr. 28, 2000

(30) Foreign Application Priority Data

Apr. 30, 1999 (JP) .......................................... 11-124812

(51) Int. Cl.$^7$ ................................................ C08K 3/34
(52) U.S. Cl. ....................... 524/492; 524/493; 524/495; 524/496; 152/209.5
(58) Field of Search ................................ 524/492, 493, 524/495, 496, 441; 152/209.5, 905

(56) References Cited

U.S. PATENT DOCUMENTS

| | | | |
|---|---|---|---|
| 4,005,054 A | | 1/1977 | Bonnefon et al. ....... 260/42.56 |
| 4,820,762 A | | 4/1989 | Guzy et al. ................ 524/512 |
| 5,225,457 A | * | 7/1993 | Borowczak et al. ........ 523/220 |
| 5,351,734 A | * | 10/1994 | Mouri et al. ............ 152/209 R |
| 5,576,104 A | * | 11/1996 | Causa et al. ................ 428/382 |
| 5,591,279 A | * | 1/1997 | Midorikawa et al. ... 152/209 R |

FOREIGN PATENT DOCUMENTS

| | | |
|---|---|---|
| EP | 0 771 836 A | 5/1997 |
| EP | 0 897 952 A | 2/1999 |

\* cited by examiner

*Primary Examiner*—Edward J. Cain
(74) *Attorney, Agent, or Firm*—Sughrue Mion, PLLC

(57) ABSTRACT

A rubber composition includes a rubber component, a polyethylene short fiber, and a blowing agent. The rubber component has a polybutadiene and at least one natural rubber or synthetic diene rubber. The polybutadiene has a weight-average molecular weight of 5,000 to 30,000 obtained as a weight-average molecular weight corresponding to polystyrene and further has a content of a cis-1,4 structure of 60 to 98%. The rubber component is 6% by weight or more polybutadiene. The short fiber has an average length of 10 mm or shorter. A pneumatic tire includes the rubber composition and exhibits excellent braking ability on ice, excellent braking ability on wet road surfaces, and improved driving stability in the early driving period. The pneumatic tire exhibits remarkable improvement in braking ability on ice even after a base rubber is exposed by abrasion of a tread rubber.

14 Claims, No Drawings

RUBBER COMPOSITION FOR TIRES AND PNEUMATIC TIRE

BACKGROUND OF THE INVENTION

1. Field of the Invention

The present invention relates to a rubber composition for tires and a pneumatic tire manufactured by using the rubber composition. More particularly, the present invention relates to a rubber composition which gives a pneumatic tire exhibiting improved braking ability on ice, braking ability on wet roads and driving stability and to a pneumatic tire using the rubber composition.

2. Description of the Related Arts

In recent years, studless tires are used as the tires exhibiting improved performances on ice. For a tread of a studless tire, a rubber composition comprising a polymer, such as polybutadiene, having a glass transition temperature lower than that of polymer used for an ordinary tire is generally used as a main component to enhance friction between the tread and frozen road surfaces. In a tire having a tread portion having a two-layer structure composed of a cap layer and a base layer, a rubber composition which is relatively soft at lower temperatures, for example by comprising a large amount of softeners or by foaming is used for a cap layer which is an outer layer of the tread and contacts road surfaces. However, this method has a drawback in that braking ability on wet surfaces of ordinary roads inevitably deteriorates although performances on ice are improved to some extent.

On the other hand, as a method for increasing the friction coefficient on wet road surfaces, it has heretofore been known that the value of tan δ at 0° C., an indicator of the degree of hysteresis loss which is well correlated to the friction coefficient on wet road surfaces, is increased by using a rubber composition containing a styrene-butadiene copolymer having a relatively high glass transition temperature as the main rubber component. With respect to the performances on ice, however, this method has a drawback in that modulus of the rubber composition increases at a low temperature region which causes the rubber composition failing to follow the change in the shape of the road surface. And further deformation of the tread surface decreases because roughness of frozen road surfaces is generally smaller than that of the road surfaces in the ordinary conditions and, as the result, contribution of energy dissipation (tan δ) between the rubber composition and road surfaces to the braking on ice decreases.

As described above, it has heretofore been difficult that both of the braking ability on ice and the bring ability on wet road surfaces are simultaneously kept at high levels,

SUMMARY OF THE INVENTION

Under the above circumstances, an object of the present invention is to provide a rubber composition which gives a pneumatic tire both a high level of braking ability on ice and a high level of braking ability on wet roads required in the market and further an improved driving stability in the early driving period and a pneumatic tire using the rubber composition. Another object of the present invention is to provide a pneumatic tire which enables remarkable improvement in braking ability on ice even after a base rubber is exposed by abrasion of a tread rubber.

As a result of intensive studies by the present inventors in order to achieve the above objects, the present invention has been completed.

In the first aspect of the present invention, a rubber composition which comprises (1) a rubber component comprising at least one of natural rubber and synthetic diene rubbers and a polybutadiene having a weight-average molecular weight of 5,000 to 30,000 obtained as a weight-average molecular weight of corresponding polystyrene and a content of a cis-1,4 structure of 60 to 98% in an amount of 6% by weight or more, and (2) a short fiber having an average length of 10 mm or shorter is provided.

It is preferable that the rubber component comprises 20% by weight or more of polybutadiene rubber and that the rubber composition comprises a polybutadiene rubber having a weight-average molecular weight of 300,000 or more obtained as a weight-average molecular weight of corresponding polystyrene and a content of the cis-1,4 structure of 80% or more.

It is also preferable that the content of the short fiber is 1 to 20 parts by weight per 100 parts by weight of the rubber component and that the short fiber is polyethylene fiber. It is also preferable that the rubber composition comprises carbon black in combination with silica or aluminum hydroxide in combination as a reinforcing filler and that the rubber composition comprises a blowing agent.

In the second aspect of the present invention, a pneumatic tire comprising the above rubber composition in a tread rubber is provided. It is preferable that, when a tread part of the pneumatic tire has a multi-layered structure, the multi-layered structure comprises a cap layer disposed at the outer side in the radial direction of the tire and a base layer disposed at the inner side in the radial direction of the tire. It is also preferable that a height from a bottom of a groove to an upper end of the base layer is 20% or more of a depth of the groove in a tire tread which has been formed and vulcanized.

DESCRIPTION OF THE PREFERRED EMBODIMENTS

The rubber composition of the present invention comprises a rubber component comprising a rubber selected from the group consisting of natural rubber and synthetic diene rubbers, a specific low molecular weight polybutadiene and short fiber.

The low molecular weight polybutadiene used in the rubber composition preferably has a weight-average molecular weight of 5,000 to 80,000 and more preferably 10,000 to 20,000 obtained as the weight-average molecular weight of corresponding polystyrene. It is generally difficult to produce a polybutadiene having a weight-average molecular weight of less than 5,000 industrially. When the weight-average molecular weight exceeds 30,000, the brag ability on wet road surfaces is not sufficiently improved. It is necessary that 6% by weight or more of the low molecular weight polybutadiene be contained in the rubber component. It is preferable that 10 to 40% by weight of the low molecular weight polybutadiene is contained in the rubber component. When the amount of the low molecular weight polybutadiene is less then 6% by weight, the braking ability on wet road surfaces is not sufficiently improved. The above rubber composition comprising the low molecular weight polybutadiene has an improved value of tan δ at 0° C. which is an indicator for the braking ability on wet road surfaces and adverse affects on the braking ability on ice can be suppressed because of the proper characteristic of polybutadiene.

In the rubber composition of the present invention which comprises short fiber as the essential component, the iron coefficient on ice can be increased by the modified form of the surface of the tread and the decrease in the friction coefficient on ice due to an increase in rigidity of tread blocks caused by the presence of the short fiber can be suppressed. The increase in rigidity of tread blocks described above rather advantageously affects the effect of the low molecular weight polybutadiene to enhance the braking ability on wet road surface and thus tan δ at 0° C. further increases. Therefore, in the pneumatic tire in which the rubber composition of the present invention comprising the specific low molecular weight polybutadiene and short fiber is used for the tread, the excellent braking ability on ice and the excellent braking ability on wet road surface can be obtained both at high levels.

When a tread of a pneumatic tire is made from the above rubber composition, in particular, from the rubber composition comprising polyethylene fiber as the short fiber and a blowing agent in combination, the braking ability of the tire on ice is remarkably improved. The mechanism of the improvement can be considered as follows.

When the rubber composition comprising polyethylene short fiber is used for a tread rubber, gases in the rubber are gathered at the polyethylene resin having a decreased viscosity during vulcanization and long closed cells having a protective layer of the resin around the cells are formed. Therefore, the vulcanized rubber contains approximately spherical closed cells and the long closed cells. The long closed cells are covered with the layer of polyethylene and are not so easily deformed by input forces from the road surface as the spherical ones are deformed.

As a tire is driven on ice, a layer of water is formed between the tire and the surface of ice by the pressure of the tire to the surface and by the heat of friction, and when the tire is prepared by using the above rubber composition comprising polyethylene short fiber for the tread rubber, the generated water within the area of the tire contacting the surface of ice is removed through numerous depressions formed from the spherical closed cells and the long closed cells coming out to the surface with the abrasion. Water is removed through the depressions formed from the long closed cells more efficiently than through the depressions formed form the spherical closed cells. Therefore, water is removed more efficiently in the present tire than in tires having spherical closed cells alone.

In the tire of the present invention, it is preferable that the short fiber is oriented in the rubber composition in a manner such that the longitudinal direction of each short fiber is placed in the circumferential direction of the tire. Long depressions arranged in the same direction play the role of gutters and efficiently remove water in the area of the tire contacting the surface of ice. Therefore, the friction coefficient on ice can be increased and the excellent braking ability on ice can be exhibited.

In the pneumatic tire prepared by using the rubber composition for treads of the present invention as an inner rubber layer of the tread, uneven wear can be suppressed during and after the middle period of the tire wear. Moreover, sufficient braking ability on ice can be exhibited during and after the middle period of the tire wear due to the efficient removal of water through the depressions of long groove-like shapes.

In the rubber composition of the present invention, it is important that the fluidity of rubber is controlled in a limited temperature range in order that the individual short fibers are oriented in the desired direction, i.e., in the direction of extrusion. It is possible that a processing aid such as a liquid polymer is suitably added to the rubber composition to reduce the viscosity and increase the fluidity and extrusion is performed in an excellent manner such that the individual short fibers are oriented in the direction of extrusion in an ideal manner while the extrusion temperature is restricted to a temperature lower than the melting temperature of the short fibers. The low molecular weight polybutadiene described above works also as the above processing aid.

In the rubber composition of the present invention, the rubber component comprises at least one rubber selected from the group consisting of natural rubber and synthetic diene rubbers. As the synthetic diene rubber, any of rubbers conventionally used for tires such as emulsion- or solution-polymerized styrene-butadiene copolymer rubbers, polyisoprene rubber, cis-1,4-polybutadiene rubber, ethylene-propylene-diene copolymer rubbers and butyl rubber or a blend of any desired rubbers can be used. It is preferable that the rubber component comprises 20% by weight or more of butadiene rubber. When the content of butadiene rubber is less than 20% by weight, it tends to become difficult that sufficient braking ability on ice is obtained.

It is preferable that butadiene rubber comprised in the rubber component is a high molecular weight butadiene rubber which has a weight-average molecular weight of 300,000 or more obtained as the weight-average molecule weight of corresponding polystyrene and a content of the cis-1,4 structure of 80% or more. When the content of the cis-1,4structure is less than 80%, abrasion resistance tends to decrease.

As for the relative amounts of (A) the above high molecular weight polybutadiene and (B) the above low molecular weight polybutadiene having a weight-average molecular weight of 5,000 to 30,000 and a content of the cis-1,4 structure of 60 to 98%, it is preferable that the amount of component (A) is 30 to 70% by weight and more preferably 40 to 70% by weight of the total amount of component (A) and component (B). When the amount of component (A) exceeds 70% by weight, processability tends to deteriorate and the effect of improving the braking ability on wet road surfaces and the braking ability on ice tends to decrease. When the amount of component (A) is less than 30% by weight, there is the possibility that workability deteriorates. From the standpoint of workability, it is preferable that the high molecular weight polybutadiene of component (A) and the low molecular weight polybutadiene of component (B) are mixed together in advance.

The short fiber used in the rubber composition for tires of the present invention has a length of 10 mm or less. When the length exceeds 10 mm, workability in mixing with rubber deteriorates. It is preferable that the amount of the short fiber mixed with the rubber component is 1 to 20 parts by weight per 100 parts by weight of the rubber component. When the amount is less than 1 part by weight, a sufficient effect of removing water cannot be obtained. When the amount exceeds 20 parts by weight, modulus tends to increase to deteriorate the braking ability of a tire on ice and processability of a rubber composition.

The kinds of the material of the short fiber are not particularly limited. Examples of the short fiber include short fibers of conventional fibers such as fibers of polyesters, polystyrene, nylon, aramide and polyethylene. Polyethylene fiber is preferable among these fibers.

The diameter of the short fiber is not particularly limited. From the standpoint of improving the braking abilities, the smaller the diameter of the fiber, the more preferable because a greater number of grooves are formed on the surface of the tire when the same amount of the fiber is used and the grooves can be dispersed more efficiently. However, when the diameter of the fiber is extremely small, the fiber is more frequently broken during production of the fiber and workability during mixing of the rubber composition is adversely affected. Therefore, an extremely small diameter of the fiber is not preferable. It is preferable that the diameter of the fiber is 0.01 to 0.1 mm. The diameter of the fiber is obtained as the average value of diameters measured by using an optical microscope at 20 positions randomly selected along the fiber.

As the reinforcing filler used in the rubber composition of the present invention, carbon black is preferable. From the standpoint of the reinforcing property and workability, carbon black having a specific surface area by nitrogen adsorption ($N_2SA$) of 50 to 150 $m^2/g$ is preferable. The reinforcing filler can be comprised of silica and/or aluminum hydroxide, and it is particularly preferable that silica is used in combination with carbon black. AB the silica, silica having $N_2SA$ of 130 to 280 $m^2/g$ is preferable in order to surely exhibit excellent workability and abrasion resistance. As fox the total amounts of reinforcing filler, it is preferable that the total amount of silica and aluminum hydroxide is 30 to 100 parts by weight and more preferably 40 to 75 parts by weight per 100 parts by weight of the rubber component. When the total amount is less than 30 parts by weight, abrasion resistance sometimes deteriorates due to the decrease in the reinforcement of rubber. When the total amount exceeds 100 parts by weight, modulus of the rubber composition increases and there is the possibility that the braking ability on ice decreases.

A silane coupling agent may be added to the rubber composition. The silane coupling agent is not particularly limited. Among various silane coupling agents, bis(3-triethoxysilypropyl) polysulfide and 3-trimethoxysilylpropylbenzothiazole tetrasulfide are preferable. It is preferable that the amount of the silane coupling agent is 0.5 to 20 parts by weight and more preferably 1 to 10 parts by weight per 100 parts by weight of the rubber component.

It is preferable that the rubber composition for tires of the present invention comprises a blowing agent. The blowing agent used in the present invention is not particularly limited. Examples of the blowing agent include dinitrosopentamethylenetetramine (DPT), azodicarbon-amide (ADCA), dinitrosopentastyrenetetramine, derivatives of benzenesulfonylhydrazine and oxybisbenzenesulfonylhydrazine (OBSH). From the standpoint of processability during production, azodicarbonamide (ADCA) is preferable among these compounds. In particular, when the blowing agent is incorporated into the polyethylene fiber in advance, it is preferable from the standpoint of workability during production of the fiber that the particle diameter of the blowing agent is made as small as possible. As the auxiliary blowing agent, agents conventionally used for producing foamed rubber products such as urea. zinc stearate, zinc benzenesulfinate, sodium benzenesulfinate and zinc oxide are preferably used. Other auxiliary blowing agents may also be used.

It is preferable that the expansion ratio of rubber composition after being vulcanized is 5 to 50%. When the expansion ratio is less than 5%, sufficient softening effect of the blowing cannot be expected and the braking ability on ice tends to deteriorate. When the expansion ratio exceeds 50%, abrasion resistance markedly deteriorates. The expansion ratio Vs is expressed as: $Vs = (\rho_0/\rho_1 - 1) \times 100\ (\%)$, wherein $\rho_1$ represents density ($g/cm^8$) of the expanded rubber and $\rho_0$ represents density ($g/cm^8$) of the solid phase in the foamed rubber.

The pneumatic tire of the present invention comprises the above rubber composition of the present invention in the rubber composition constituting the tread part. The structure of the tread part of the pneumatic tire is not particularly limited and may be a single-layered structure or a multi-layered structure depending on the application. When the tread part has a multi-layered structure, it is preferable that the multi-layered structure is a two-layer structure comprising a cap layer disposed at the outer side in the radial direction of the tire and a base layer and disposed at the inner side in the radial direction of the tire. It is also preferable that the height from the bottom of a groove to the upper end of the base layer is 20% or more of the depth of the groove in the tire tread which has been formed and vulcanzied. When any the above rubber composition is applied to an inner layer of the tread, the effect of the present invention can be exhibited even when the base rubber is exposed by abrasion.

When any of the above rubber composition of the present invention is applied to the cap rubber and the base rubber at the same time, the braking ability on ice and the braking ability on wet road surfaces are both remarkably improved and, moreover, driving stability in the early driving period (before exposure of the base rubber) on ordinary roads can also be remarkably improved.

In the above rubber composition, other components comprised in the rubber composition are not particularly limited. Additives conventionally used in the rubber industry such as carbon black, processing oils, zinc oxide, zinc stearate, vulcanizing agents, vulcalization accelerators, antoxidants and antiozonants may be used.

To summarize the advantages obtained by the present invention, the pneumatic tire of the present invention exhibits both of remarkably improved braking ability on ice and remarkably improved braking ability on wet road surfaces while the excellent level of driving stability in the early driving period is surely exhibited because the rubber composition comprising the specific low molecular weight polybutadiene and the short fiber is used for the tread rubber composition. Moreover, the pneumatic tire exhibiting both of excellent braking ability on ice and excellent braking ability on wet road surfaces even after the base rubber is exposed by abrasion can be obtained in accordance with the present invention.

EXAMPLES

The present invention will be described more specifically with reference to examples in the following. However, the present invention is not limited to the examples.

[Methods of measurements]

The performances of the sample tires and properties of the rubber compositions were evaluated by the measurements in accordance with the following methods.

(1) Driving Stability in the Early Driving Period

A vehicle attached with new sample tires was driven in a probing ground and the driving property, the braking ability, the response to steering and the controllability during driving were evaluated. The driving stability in the early driving period was evaluated from these evaluations. The result was expressed as an index based on the result in a Comparative Example 1 which was set at 100. The greater the value, the better the driving stability in the early driving period.

(2) Braking Ability on Wet Road Surfaces

Sample tires were attached to four wheels of a passenger car and the vehicle was driven in a probing ground. Brake was applied when the vehicle was driven at the initial speed of 70 km/hour on a wet road and the distance driven before stopping was measured. Reciprocal of the obtained distance was used for the evaluation of the braking ability on wet road surfaces. The result was expressed as an index based on the result in a Comparative Example 1 which was set at 100. The greater the value, the better the braking ability on wet road surfaces.

(3) Braking Ability on Ice

Sample tires were attached to four wheels of a passenger car and the vehicle was driven in a probing ground. Brake was applied when the vehicle was driven at the initial speed of 20 km/hour on a road covered with ice and the distance driven before stopping war, measured. Reciprocal of the obtained distance was used for the evaluation of the braking ability on ice. The result was expressed as an index based on the result in a Comparative Example which was set at 100. The greater the value, the better the brig ability on ice.

(4) Dynamic Storage Modulus E'

The dynamic storage modulus was measured with a sample having a width of 5 mm, a length of 20 mm and a thickness of 2.0 mm using SPECTROMETER manufactured by TOYO SLIKI SEISAKUSHO, Ltd. in the condition of a temperature of 30° C., a frequency of 50 Hz, an initial load of 150 gf and a dynamic strain amplitude of 2%. The results are expressed as an index based on the result in a Comparative Example which was set to 100. The greater the value, the higher the modulus.

[Preparation of Low Molecular weight Polybutadiene rubber]

Into a 1.5 liter autoclave equipped with a stirrer and purged with nitrogen, 800 ml of benzene and 124 g of 1,3-butadiene were placed and stirred. Water in an amount of 1.66 mmol was added to and dissolved into the obtained mixture. To the resultant solution, 4.16 mmol of diethylaluminum monochloride was added. After the obtained solution was heated to 80° C., 0.02 mmol of nickel octoate was added and polymerization was allowed to proceed at 80° C. for 30 minutes. When the polymerization was completed, the polymerization was terminated by adding 5 ml of methanol containing a small amount of 2,6-di-tert-butyl-p-cresol to the polymerization solution. After the pressure was released, the polymerization solution was taken out and dried in vacuo and polybutadiene was obtained. The microstructure of the prepared polybutadiene was obtained from the absorption intensities at 740 $cm^{-1}$ assigned to the cis-structure, 987 $cm^{-1}$ assigned to the trans-structure and 910 $cm^{-1}$ assigned to the vinyl-structure in the infrared absorption spectrum and the content of the cis-structure was found to be 91.0% by weight. The inherent viscosity [η] measured in a toluene solution at 30° C. was 0.3. The weight-average molecular weight Mw and the ratio of the weight-average molecular weight to the number-average molecular weight Mw/Mn where obtained by the measurement in accordance with the gel permeation chromatography (GFC) as the values of corresponding polystyrene. Mw was found to be 20,000 and Mw/Mn was found to be 2.2.

[Preparation of Polybutadiene Rubber Prepared Rubber]

Polybutadiene rubber (a prepared rubber) was obtained by mixing the low molecular weight polybutadiene obtained above with the same amount by weight of a high molecular weight polybutadiene having a content of the cis-structure of 97.9%, [η] of 4.3 and a weight-average molecular weight Mw of 1,350,000.

[Preparation of Test Tires]

Radial tires for passenger cars of a size of 205/60R15 in which the tread had the cap/base structure were prepared in accordance with a conventional process. In the tread of these tires the height from the bottom of the groove to the upper end of the base layer was 40% or more of the depth of the groove.

Examples 1 to 6 and Comparative Examples 1 and 2

Using rubber compositions a to h shown in Table 1 as the cap rubber and rubber composition U shown in Table 2 as the base rubber, sample tires having the tread rubber compositions shown in Table 3 were prepared.

In the data of dynamic modulus, the result of rubber composition a is used as a control for rubber compositions b, c and d, and the result of rubber composition e is used for rubber compositions f, g and h.

TABLE 1

| Rubber composition for cap rubber | | Rubber composition of the present invention | | | | Rubber composition of the present invention | | |
|---|---|---|---|---|---|---|---|---|
| (Part by weight) | a | b | c | d | e | f | g | h |
| Natural rubber | 70 | 70 | 70 | 30 | 70 | 70 | 70 | 30 |
| Butadiene rubber BR01[1)] | 30 | — | — | — | 30 | — | — | — |
| Butadiene rubber (prepared rubber)[2)] | — | 30 | 30 | 70 | — | 30 | 30 | 70 |
| Carbon black[3)] | 25 | 25 | 25 | 25 | 25 | 25 | 25 | 25 |
| Silica[4)] | 25 | 25 | 25 | — | 25 | 25 | 25 | — |
| Aluminum hydroxide[5)] | — | — | — | 20 | — | — | — | 20 |
| Coupling agent[6)] | 2.5 | 2.5 | 2.5 | 2 | 2.5 | 2.5 | 2.5 | 2 |
| Zinc oxide | 2.5 | 2.5 | 2.5 | 2.5 | 2.5 | 2.5 | 2.5 | 2.5 |
| Softener | 5 | 3 | 8 | 0 | 5 | 8 | 3 | 0 |
| Stearic acid | 1 | 1 | 1 | 1 | 1 | 1 | 1 | 1 |
| Antioxidant | 1 | 1 | 1 | 1 | 1 | 1 | 1 | 1 |
| Wax | 0.2 | 0.2 | 0.2 | 0.2 | 0.2 | 0.2 | 0.2 | 0.2 |
| Diphenylguanidine | 0.8 | 0.4 | 0.4 | 0.8 | 0.3 | 0.4 | 0.4 | 0.8 |
| Dibenzothiazyl disulfide | 0.8 | 0.5 | 0.5 | 0.8 | 0.3 | 0.5 | 0.5 | 0.8 |
| NS[7)] | 0.5 | 0.8 | 0.8 | 1.0 | 0.5 | 0.8 | 0.8 | 1.0 |
| Sulfur | 1.5 | 1.8 | 1.8 | 1.8 | 1.5 | 1.8 | 1.8 | 1.8 |
| Blowing agent[8)] | — | — | — | — | 4 | 4 | 4 | 4.5 |
| Polyethylene fiber* | — | 2 | 5 | 2 | — | 2 | 5 | 2 |

TABLE 1-continued

| Rubber composition for cap rubber | Rubber composition of the present invention | | | | Rubber composition of the present invention | | | |
|---|---|---|---|---|---|---|---|---|
| (Part by weight) | a | b | c | d | e | f | g | h |
| Shape of fiber *polyethylene fiber | | | | | | | | |
| length (mm) | — | 2 | 3 | 2 | — | 2 | 3 | 2 |
| diameter (mm) | — | 0.03 | 0.04 | 0.03 | — | 0.03 | 0.04 | 0.08 |
| Vulcanized rubber | | | | | | | | |
| expansion ratio (%) | — | — | — | — | 25 | 25 | 28 | 35 |
| dynamic storage modulus E' | 100 (control) | 110 | 115 | 110 | 100 (control) | 110 | 115 | 105 |

[1] Manufactured by JSR Corporation; cis-1,4-polybutadiene
[2] A blend of (B) low molecular weight polybutadiene and (A) high molecular weight polybutadiene [(B)/(A) = 50/50 by weight]
[Component (B): [η] = 0.3; Mw = 20.00; content of cis-structure = 91.0%]
[Component (A): [η] = 4.3; Mw = 1,350.000; content of cis-structure = 97.9]
[3] Manufactured by TOKAI CARBON Co., Ltd.; SIEST 7H
[4] Manufactured by NIPPON SILICA KOGYO Co., Ltd.; NIPSIL AQ
[5] Manufactured by SHOWA DENKO Co., Ltd.; HISILITE H-43M; average particle diameter: 0.6 μm
[6] bis(8-Triethoxysilylpropyl) tetrasulfide
[7] N-tert-Butyl-2-benzothiazylsulfenamide
[8] Manufactured by OTSUKA KAGAKU Co., Ltd.; azodicarbonamide (ADCA)

TABLE 2

| Rubber composition for base rubber | Rubber composition of the present invention | | | | |
|---|---|---|---|---|---|
| (Part by weight) | U | V | W | X | Y |
| Natural rubber | 35 | 35 | 35 | 35 | 35 |
| Butadiene rubber BR31[9] | 48.18 | — | — | — | — |
| Butadiene rubber (prepared rubber)[2] | — | 35 | 35 | 35 | 35 |
| SBR 1712[10] | 41.25 | 41.25 | 41.25 | 41.25 | 41.25 |
| Carbon black[3] | 40 | 40 | 40 | 20 | 20 |
| Silica[4] | — | — | — | 20 | — |
| Aluminum hydroxide[5] | — | — | — | — | 15 |
| Coupling agent[6] | — | — | — | 2 | 1.5 |
| Zinc oxide | 2.5 | 2.5 | 2.5 | 2.5 | 2.5 |
| Softener | 15 | 5 | 5 | 5 | 5 |
| Stearic acid | 1 | 1 | 1 | 1 | 1 |
| Antioxidant | 1 | 1 | 1 | 1 | 1 |
| Wax | 0.2 | 0.2 | 0.2 | 0.2 | 0.2 |
| Diphenylguanidine | 0.3 | 0.8 | 0.8 | 0.8 | 0.8 |
| Dibenzothiazyl disulfide | 0.3 | 0.5 | 0.5 | 0.5 | 0.5 |
| NS[7] | 0.5 | 0.7 | 0.7 | 0.7 | 0.7 |
| Sulfur | 1.8 | 1.8 | 1.8 | 1.8 | 1.8 |
| Polyethylene fiber* Shape of fiber *polyethylene fiber | — | 2 | 5 | 2 | 2 |
| length (mm) | — | 2 | 3 | 2 | 2 |
| diameter (mm) | — | 0.08 | 0.04 | 0.03 | 0.03 |
| Vulcanized rubber | | | | | |
| dynamic storage modulus E' | 100 (control) | 110 | 115 | 109 | 109 |

[9] Manufactured by JSR Corporation; an oil extended cis-1,4-butadiene (containing 37.5 parts by weight of an aromatic oil per 100 parts by weight of the rubber component)
[10] Manufactured by JSR Corporation; an oil extended styrene-butadiene copolymer (containing 37.5 parts by weight of an aromatic oil per 100 parts by weight of the rubber component)
Others are the same as those in Table 1.

The driving stability in the early driving period, the braking ability on wet road surfaces and the braking ability on ice of the tires prepared above were evaluated. The results in Examples 1 to 3 are shown as indices using the corresponding results in Comparative Example 1 as the control and the results in Examples 4 to 6 are shown as indices using the corresponding results in Comparative Example 2 as the control. The results are shown in Table 3.

TABLE 3-1

| | Comparative Example 1 | Example 1 | Example 2 | Example 3 |
|---|---|---|---|---|
| Rubber composition for tread | | | | |
| cap rubber (not expanded) | a | b | c | d |
| base rubber | U | U | U | U |
| Tire performance | | | | |
| driving stability in early driving period (index) | 100 | 102 | 105 | 102 |
| braking ability on wet road surfaces (index) | 100 | 105 | 109 | 115 |
| braking ability on ice (index) | 100 (control) | 102 | 105 | 106 |

TABLE 3-2

| | Comparative Example 2 | Example 4 | Example 5 | Example 6 |
|---|---|---|---|---|
| Rubber composition for tread | | | | |
| cap rubber (expanded) | e | f | g | h |
| base rubber | U | U | U | U |
| Tire performance | | | | |
| driving stability in early driving period (index) | 100 | 102 | 105 | 101 |

TABLE 3-2-continued

|  | Comparative Example 2 | Example 4 | Example 5 | Example 6 |
|---|---|---|---|---|
| braking ability on wet road surfaces (index) | 100 | 104 | 108 | 110 |
| braking ability on ice (index) | 100 (control) | 110 | 116 | 115 |

As shown by the results in Table 3, the tires in Examples 1 to 6 were prepared by using rubber compositions b to d and f to h of the present invention (containing polyethylene fiber) for the cap rubber. These tires exhibited remarkable improvement in both of the braking ability on wet road surfaces and the braking ability on ice while the diving stability in the early driving period was surely held at the excellent level. In particular, the tires in Examples 4 to 6 in which foamed rubber compositions f, g and h were used for the cap rubber exhibited particularly remarkable improvement in the braking ability on ice.

Examples 7 to 0 and Comparative Example 3

Using rubber compositions a and g shown in Table 1 as the cap rubber and rubber compositions U to Y shown in Table 2 at the base rubber, sample tires having the tread rubber compositions shown in Table 4 were prepared.

TABLE 4

|  | Comparative Example 8 | Example 7 | Example 8 | Example 9 | Example 10 |
|---|---|---|---|---|---|
| Rubber composition for tread |  |  |  |  |  |
| cap rubber | a | g | g | g | g |
| base rubber | U | V | W | X | Y |
| Tire performance |  |  |  |  |  |
| braking ability on wet road surfaces after use (index) | 100 | 105 | 106 | 110 | 108 |
| braking ability on ice after use (index) | 100 (control) | 102 | 103 | 102 | 102 |

The tires prepared above were attached to a passenger car. After the passenger car was driven for 30,000 km and exposure of the base rubber was confirmed, the braking ability on wet road surfaces (the braking ability on wet road surfaces after use) and the braking ability on ice (the braking ability on ice after use) were evaluated. The tests were conducted in the similar way as described above. The results in Examples are shown as indices using the corresponding results in Comparative Example 3 as the control. The results are shown in Table 4.

As shown by the results in Table 4, the tires in Examples 7 to 10 which were prepared by using the rubber compositions of the present invention for both of the cap rubber and the base rubber exhibited remarkable improvement in both of the braking ability on wet road surfaces and the braking ability on ice even after the tread base rubber was exposed by the use for a long time.

What is claimed is:

1. A rubber composition which comprises (1) a rubber component comprising (a) at least one of natural rubber and synthetic diene rubbers and (b) a polybutadiene having a weight-average molecular weight of 5,000 to 30,000 obtained as a weight-average molecular weight corresponding to polystyrene, and (2) a polyethylene short fiber having an average length of 10 mm or shorter, wherein the polybutadiene is 6% by weight or more of the rubber component and has a content of a cis-1,4 structure of 60 to 98%, and further (3) a blowing agent.

2. A rubber composition according to claim 1, wherein the rubber component comprises 20 parts by weight or more of polybutadiene rubber per 100 parts by weight of the rubber component.

3. A rubber composition according to claim 1, wherein the synthetic diene rubber is polybutadiene rubber having a weight-average molecular weight of 300,000 or more obtained as a weight-average molecular weight corresponding to polystyrene and a content of a cis-1,4 structure of 80% or more.

4. A rubber composition according to claim 1, wherein an amount of the short fiber is 1 to 20 parts by weight per 100 parts by weight of the rubber component.

5. A rubber composition according to claim 1, wherein a diameter of the short fiber is 0.01 to 0.1 mm.

6. A rubber composition according to claim 1, which further comprises 30 to 100 parts by weight of a reinforcing filler per 100 parts by weight of the rubber component.

7. A rubber composition according to claim 6, wherein the reinforcing filler comprises carbon black.

8. A rubber composition according to claim 6, wherein the reinforcing filler comprises silica and/or aluminum hydroxide.

9. A rubber composition according to claim 1, wherein an expansion ratio of rubber after being vulcanized is 5 to 50%.

10. A pneumatic tire comprising a tread part, wherein the tread part comprises a rubber composition (A) which comprises (1) a rubber component comprising (a) at least one of natural rubber and synthetic diene rubbers and (b) a polybutadiene having a weight-average molecular weight of 5,000 to 30,000 obtained as a weight-average molecular weight corresponding to polystyrene, and (2) a polyethylene short fiber having an average length of 10 mm or shorter, wherein the polybutadiene is 6% by weight or more of the rubber component and has a content of a cis-1,4 structure of 60 to 98%, and further (3) a blowing agent.

11. A pneumatic tire according to claim 10, wherein the tread part has a multi-layered structure and at least one of the layers is comprised of the rubber composition (A).

12. A pneumatic tire according to claim 11, a wherein the rubber composition (A) is used in an inner layer of the tread part.

13. A pneumatic tire according to claim 12, wherein the tread part has a two-layer structure which comprises a cap layer and a base layer.

14. A pneumatic tire according to claim 13, wherein a height from a bottom of a groove to an upper end of the base layer is 20% or more of a depth of the groove in a tire tread which has been formed and vulcanized.

* * * * *